(12) United States Patent
Audy

(10) Patent No.: US 8,129,862 B2
(45) Date of Patent: Mar. 6, 2012

(54) SCALABLE HIGHEST AVAILABLE VOLTAGE SELECTOR CIRCUIT

(75) Inventor: Jonathan Mark Audy, Los Gatos, CA (US)

(73) Assignee: Analog Devices, Inc., Morwood, MA (US)

( * ) Notice: Subject to any disclaimer, the term of this patent is extended or adjusted under 35 U.S.C. 154(b) by 305 days.

(21) Appl. No.: 12/605,026

(22) Filed: Oct. 23, 2009

(65) Prior Publication Data

US 2011/0095614 A1    Apr. 28, 2011

(51) Int. Cl.
*H02J 3/00* (2006.01)
(52) U.S. Cl. ............... 307/80; 307/85; 307/86; 307/87; 327/62; 327/63; 327/65; 327/407; 327/408
(58) Field of Classification Search .............. 307/80, 307/85–87, 125, 130, 131; 327/62–63, 65, 327/407, 408
See application file for complete search history.

(56) References Cited

U.S. PATENT DOCUMENTS

| | | | | |
|---|---|---|---|---|
| 3,555,290 | A * | 1/1971 | Ellermeyer | 307/65 |
| 4,627,707 | A | 12/1986 | Tani et al. | 355/14 R |
| 5,070,255 | A | 12/1991 | Shin | 307/268 |
| 5,175,291 | A | 12/1992 | Kufner-Muhl | 544/267 |
| 6,040,718 | A * | 3/2000 | Henry | 327/71 |
| 6,242,971 | B1 | 6/2001 | Manstretta et al. | 327/537 |
| 6,359,497 | B1 * | 3/2002 | Criscione | 327/408 |
| 6,476,664 | B2 | 11/2002 | Rolandi et al. | 327/534 |
| 6,600,239 | B2 * | 7/2003 | Winick et al. | 307/85 |
| 6,847,249 | B1 * | 1/2005 | Brokaw | 327/408 |
| 7,298,181 | B2 * | 11/2007 | Khan et al. | 327/70 |

* cited by examiner

*Primary Examiner* — Jared Fureman
*Assistant Examiner* — Alfonso Perez Borroto
(74) *Attorney, Agent, or Firm* — Koppel, Patrick, Heybl & Philpott

(57) ABSTRACT

A scalable highest available voltage selector circuit determines the highest of n input voltages and connects the highest voltage to an output. The circuit has at least n circuit branches, each of which comprises n–1 "comparator" FETs connected between an input voltage and an output node, and a diode-connected FET connected between the output node and a current source. The junction of the diode-connected transistor and current source provides a control signal used by the other branches. Each of a branch's comparator FETs have their gates connected to a respective one of the other branches' control signals, such that they are driven on regeneratively when the applied input voltage is the highest of the n input voltages. Each branch also includes n–1 "shorting" FETs connected across the diode-connected transistor, arranged to be driven off when the applied input voltage is the highest, but which are otherwise driven on.

18 Claims, 4 Drawing Sheets

SCALABLE HIGHEST AVAILABLE VOLTAGE SELECTOR CIRCUIT

BACKGROUND OF THE INVENTION

1. Field of the Invention

This invention relates to the field of comparators, and particularly to comparator-based circuits for selecting the most positive of several available input voltages.

2. Description of the Related Art

For some electronics applications, multiple power forms are available to power the circuitry. For example, a voltage regulator's input voltage might be selected from any of several available primary and auxiliary supply voltages.

In some applications of this sort, it is useful to determine which of the available voltages is the highest. For example, in a linear voltage regulator, the control circuits which operate the pass device should be referred to a voltage at least as high as the input voltage selected for regulation. In addition, for a regulator implemented with field-effect transistors (FETs), the n-well of any FET connected to the regulated output should connect to the most positive voltage available, to avoid forward biasing its body diode(s).

One or more comparators might typically be used to determine the highest available voltage. However, a comparator as might be used for this purpose must itself be powered from one or more supply voltages; these supply voltages establish the comparator's input voltage range. However, this range might be exceeded by one or more of the voltages being compared, which could render the comparator's output unreliable. The comparator's output voltage swing would also be defined by its supply voltages. As such, the output might not swing between the largest available voltages, and thus might be unsuitable for use by circuits intended to be responsive to the output.

SUMMARY OF THE INVENTION

A scalable highest available voltage selector circuit is presented which overcomes the problems noted above.

The present voltage selector circuit determines the highest of n available input voltages, and connects the highest voltage to an output terminal. The circuit has at least n circuit branches. In a preferred embodiment, each of the branches comprises n−1 "comparator" transistors, suitably field-effect transistors (FETs), having their current circuits (i.e., source-drain circuits in the case of a FET) connected between a respective one of the available input voltages and an output node, and a diode-connected transistor connected between the output node and a respective current source such that it conducts a bias current to the comparator transistors. The voltage at the junction of the diode-connected transistor and current source provides a control signal for that circuit branch, which is used by the other branches as discussed below.

Each of a circuit branch's n−1 comparator transistors have their control inputs (i.e., gates in the case of a FET) connected to a respective one of the other branches' control signals. The circuit is arranged such that a given branch's comparator transistors are driven on regeneratively and the comparator transistors of the other branches are driven off when the input voltage applied to the given circuit branch is the highest of the n input voltages.

Each circuit branch also includes n−1 "shorting" transistors, having their current circuits connected across the diode-connected transistor. Each of a given branch's shorting transistors have their control inputs connected to a respective one of the other branches' control signals such that the given branch's transistors are driven off when the input voltage applied to that branch is the highest of the n input voltages, and are otherwise driven on by the other branches' control signals.

The present voltage selector circuit also include n switching circuits, each of which is coupled to the output node of a respective one of the circuit branches. The voltage selector circuit is arranged such that each switching circuit connects the input voltage connected to the branch to a voltage selector circuit output terminal only when the input voltage applied to that branch is the highest of the n input voltages, such that the voltage at the voltage selector circuit output terminal is the highest of the n input voltages.

The selected voltage can be connected to, for example, the wells of MOSFETs to ensure that they are connected to the most positive of the available input voltages, so as to avoid forward biasing their body diodes. The selected voltage can also be used to power circuits which should be referred to the highest available input voltage.

Further features and advantages of the invention will be apparent to those skilled in the art from the following detailed description, taken together with the accompanying drawings.

DETAILED DESCRIPTION OF THE INVENTION

Figure 1:
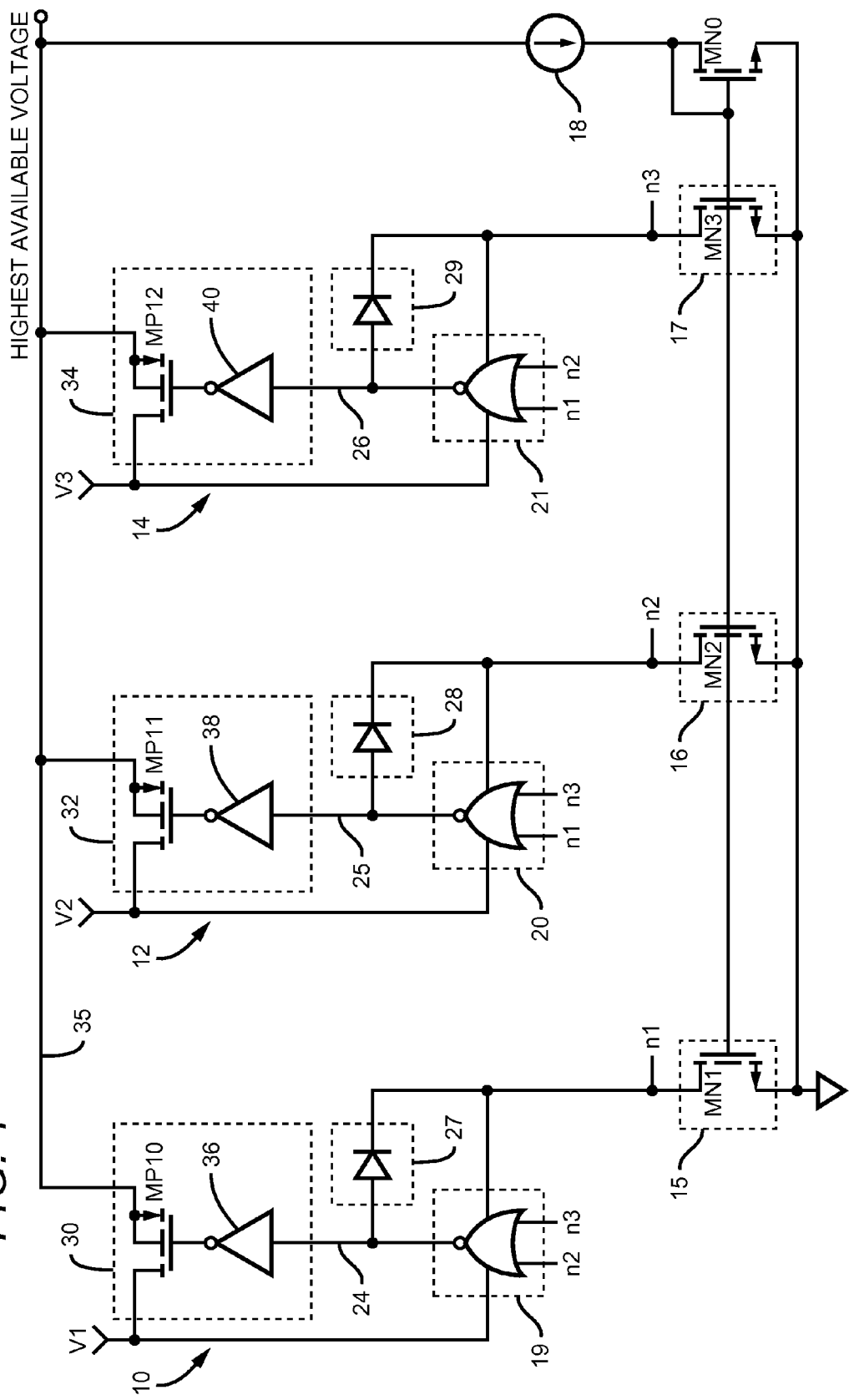
FIG. 1 is a schematic diagram illustrating the basic principles of a voltage selector circuit per the present invention.

A schematic diagram illustrating the basic principles of a voltage selector circuit which connects the highest of n available input voltages to an output terminal is shown in FIG. 1. In this exemplary embodiment, three input voltages V1, V2 and V3 are available. Each input voltage is applied to a respective circuit branch 10, 12, 14, such that there are at least n circuit branches. Each branch receives a bias current from a respective current source 15, 16, 17, such that there are at least n current sources which output respective bias currents; the bias currents for each branch are preferably equal. In this exemplary embodiment, each current source is implemented with an NMOS FET (MN1, MN2, MN3) connected in a current mirror configuration with a diode-connected input FET (MN0) which receives an input current from a current source 18, though other current source arrangements might also be used.

Note that, for simplicity, the voltage selector circuits described below and shown in the figures are shown as being implemented with field-effect transistors (FETs). However, this is not essential; other types of transistors, including bipolar junction transistors (BJTs), might also be used. By way of definition, the term "control input" as used herein refers to a transistor's gate terminal if it is a FET, or its base terminal if a BJT. Similarly, the term "current circuit" refers to a transistor's drain and source terminals if a FET, or its collector and emitter terminals if a BJT.

In the illustrative embodiment shown in FIG. 1, each circuit branch includes a circuit (19, 20, 21) that provides the functionality of a logic gate having n−1 input terminals and an output node (24, 25, 26), with the first supply terminal connected to a respective one of the input voltages and the second supply terminal connected to a respective one of the current sources. A circuit (27, 28, 29) providing a diode function is connected between the gate circuit's output node and the second supply terminal. The voltage at the junction of each branch's diode and its current source serves as a control signal which is used by the other branches; these control signals are labeled as n1, n2 and n3 for branches 10, 12 and 14, respectively.

Each of the logic gate circuit's input terminals is connected to a respective one of the other branches' control signals, with each logic gate circuit arranged such that its output node is toggled from a first state to a second state regeneratively and the logic gate circuit output nodes of the other branches are in the first state when the input voltage connected to that branch is the highest of the n input voltages. In the embodiment of FIG. 1, this functionality is provided when the logic gate circuits 19, 20, 21 provide the functionality of a NOR gate, such that the 'first' state is 'low' and the 'second' state is 'high', though other gate types might be suitable when the voltage selector circuit is configured differently.

The present voltage selector circuit also includes n switching circuits, each of which is coupled to the output of a respective one of the logic gate circuits, with each switching circuit arranged to connect the input voltage applied to the branch to a voltage selector circuit output terminal when the input voltage connected to that branch is the highest of the n input voltages, thereby making the voltage at the voltage selector circuit output terminal the highest of the n input voltages. In the exemplary embodiment shown in FIG. 1, circuit branches 10, 12 and 14 are coupled to switching circuits 30, 32 and 34, respectively. In this example, switching circuits 30, 32 and 34 are implemented with inverters 36, 38 and 40, respectively, which are connected at their inputs to respective logic gate circuit output nodes 24, 25 and 26, and drive respective PMOS FETs MP10, MP11 and MP12. Thus, if V1 is greater than V2 and V3, for example, output node 24 is 'high' and the output of inverter 36 is low, such that FET MP10 is on and connects V1 to output terminal 35, while output nodes 25 and 26 are low and the outputs of inverters 38 and 40 are high, such that FETs MP11 and MP12 are off, isolating V2 and V3 from terminal 35.

Figure 2:
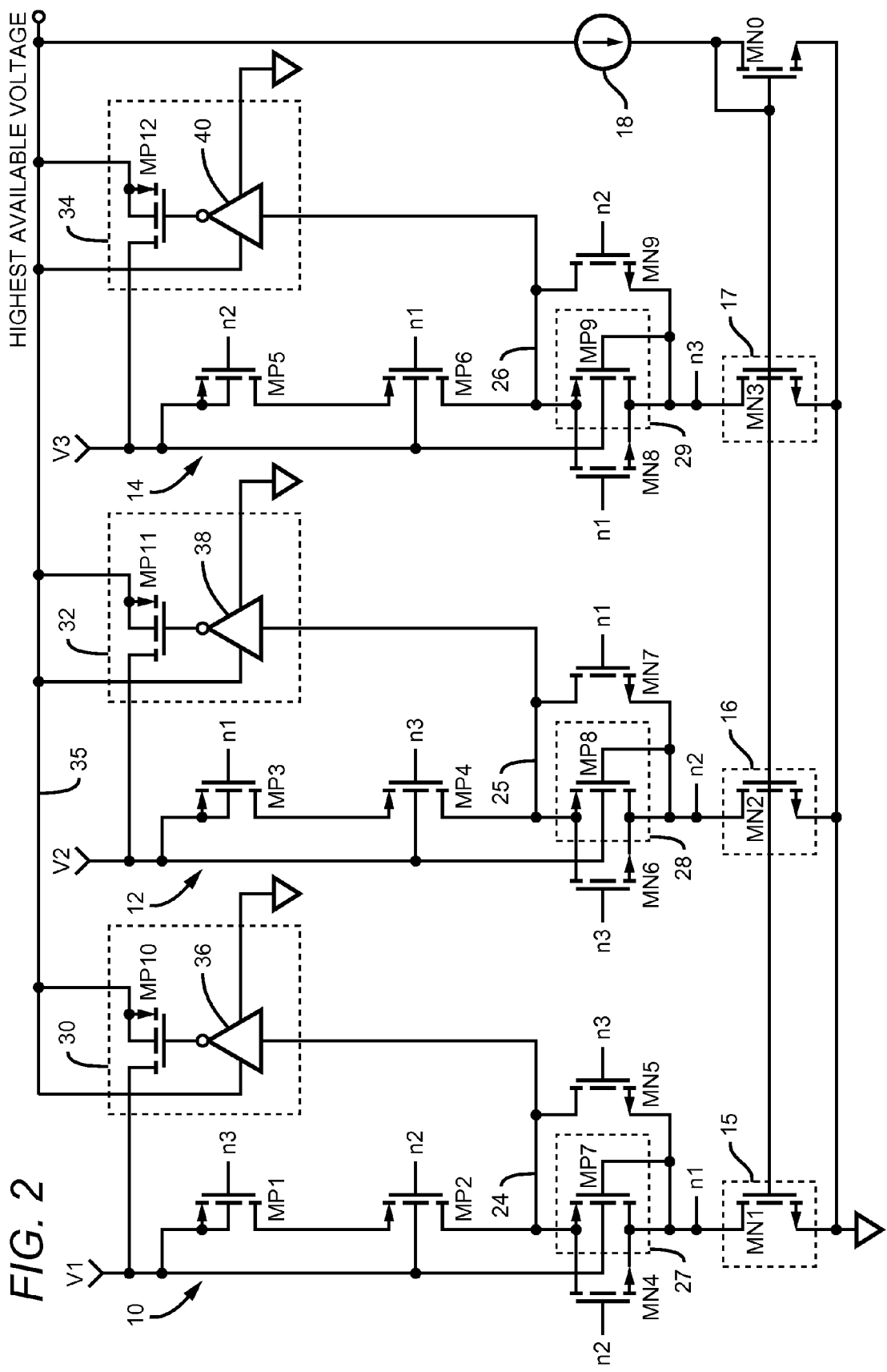
FIG. 2 is a schematic diagram of one possible embodiment of a voltage selector circuit per the present invention.

One possible implementation of a voltage selector circuit per the present invention is shown in FIG. 2. Here, each logic gate circuit preferably includes n−1 "comparator" FETs, having their drain-source circuits connected between a respective one of the available input voltages and an output node (24, 25, 26). In FIG. 2, n is 3, though the circuit could be scaled for use with any number of input voltages. Thus, circuit branch 10 includes 2 comparator FETs MP1 and MP2 connected in series between V1 and output node 24. Similarly, circuit branch 12 includes 2 comparator FETs MP3 and MP4 connected in series between V2 and output node 25, and circuit branch 14 includes 2 comparator FETs MP5 and MP6 connected in series between V3 and an output node 26.

The circuits 29, 30, 31 providing a diode function are preferably implemented with respective diode-connected FETs, each of which is connected between its branch's output node and current source, such that it conducts the current source's bias current to the comparator FETs. Here, circuit branch 10 includes a diode-connected FET MP7 connected between output node 24 and current source 16, circuit branch 12 includes a diode-connected FET MP8 connected between output node 26 and current source 18, and circuit branch 14 includes a diode-connected FET MP9 connected between output node 28 and current source 20. The voltages at the junctions of each branch's diode-connected FET and its current source serves as the control signals n1, n2 and n3 used by the other branches.

Each branch preferably also includes n−1 "shorting" FETs having their drain-source circuits connected across the branch's diode-connected FET such that they provide a low resistance conductive path around the diode-connected FET when on. Thus, branch 10 includes two shorting FETs MN4, MN5 connected across MP7, branch 12 includes two shorting FETs MN6, MN7 connected across MP8, and branch 14 includes two shorting FETs MN8, MN9 connected across MP9.

Each of a given branch's comparator FETs have their gates connected to a respective one of the other branches' control signals such that the given branch's comparator FETs are driven on regeneratively and the comparator FETs of the other branches are driven off when the input voltage connected to the given branch is the highest of the n input voltages. Thus, in the exemplary embodiment shown in FIG. 2, the gates of comparator FETs MP1 and MP2 are connected to control signals n3 and n2, respectively (though they could alternatively be connected to control signals n2 and n3, respectively, without affecting the circuit's operation), comparator FETs MP3 and MP4 are connected to control signals n1 and n3, and comparator FETs MP5 and MP6 are connected to control signals n2 and n1.

The determination of which of V1, V2 and V3 is more positive is made by a comparator formed by FETs MP1-MP6, the inputs of which are the sources of FETs MP1, MP3 and MP5. These FETs are connected in a positive feedback arrangement, such that MP1 and MP2 are driven on regeneratively when V1 is the highest input voltage, MP3 and MP4 are driven on regeneratively when V2 is the highest input voltage, and MP5 and MP6 are driven on regeneratively when V3 is the highest input voltage. In general, the branch connected to the highest input voltage will also have the highest voltage among control signals n1, n2 and n3. For example, if V1 is the highest, the voltage for control signal n1 will be greater than that for n2 and n3. With n1 'high', MP3 and MP6 will be off, such that n2 and n3 are pulled 'low' by current sources 16 and 17, respectively, which in turn ensures that FETs MP1 and MP2 of branch 10 are solidly on. Thus, in general, the output node for the branch to which the highest input voltage is applied is pulled 'high', while the output nodes for the other branches are pulled 'low'.

As with FIG. 1, the switching circuits 30, 32 and 34 in FIG. 2 are implemented with inverters 36, 38 and 40, respectively, which are connected at their inputs to respective branch output nodes 24, 26 and 28, and drive respective PMOS FETs MP10, MP11 and MP12.

Thus, if V1 is greater than V2 and V3, for example, output node 24 is 'high' and the output of inverter 36 is 'low', such that FET MP10 is on and connects V1 to output terminal 35, while output nodes 26 and 28 are low and the outputs of inverters 38 and 40 are high, such that FETs MP11 and MP12 are off, isolating V2 and V3 from terminal 35.

Each of a circuit branch's n−1 shorting FETs have their gates connected to a respective one of the other branches' control signals, such that the branch's shorting FETs are driven off when the input voltage connected to the branch is the highest of the input voltages, and are otherwise driven on by the other branches' control signals. For example, as noted above, if V1 is the highest input voltage, n1 is 'high' and n2 and n3 are 'low'. This serves to turn off shorting FETs MN4 and MN5, such that no low resistance conductive path is provided around diode-connected FET MP7. However, with n1 'high', shorting FET MN7 in branch 12 and shorting FET MN8 in branch 14 will be on, effectively providing a low resistance conductive path around diode-connected FETs MP8 and MP9, respectively. This serves to increase the voltage swing at nodes 25 and 26.

Because of the positive feedback arrangement and regenerative switching, the drain terminals of MP2, MP4 and MP6 (output nodes 24, 25 and 26) would normally exhibit a large voltage swing when the comparator changes states, which would be cross-coupled back to the gates of the opposing FETs—thereby causing the comparator to exhibit hysteresis which may be unwanted or unacceptably large. Diode-connected FETs MP7-MP9 serve to limit the positive swing at nodes n1-n3—and thus at the gates of MP1-MP6—that would otherwise occur when the comparator changes state.

The presence of MP7-MP9 as described herein also serves to diminish the overdrive needed to switch the comparator. Because MP7-MP9 are FETs like MP1-MP6, the "spacer" voltage provided by MP7-MP9 is just right to minimize the extra drive required to switch the comparator. The use of MP7-MP9 in this way also ensures that the spacer voltage tracks variations in MP1-MP6 due to temperature and lot-to-lot manufacturing differences. In this way, MP7-MP9 provide control over the hysteresis of the comparator. If sized the same as MP1-MP6, hysteresis can be virtually eliminated. Sizing MP7-MP9 larger or smaller than MP1-MP6 can create a small hysteresis, or create a small overlap of states, if desired.

When arranged as described above, the present voltage selector circuit can be powered by the input voltages it compares. For example, the current source 18 from which the circuit's bias currents are derived can be coupled to output terminal 35 and thereby powered by the highest available voltage, though current source 18 might alternatively be powered by other sources. In addition, output nodes 24, 25 and 26 swing up to the largest available input voltage. And, as the output terminal 35 is always equal to the largest available input voltage, it can be connected to the wells of MOSFETs such as MP10-MP12—thereby preventing their body diodes from becoming forward-biased.

As noted above, the present voltage selector circuit is scalable, in that it can be easily adapted for use with any number of input voltages. Also note that the implementation shown in FIG. 2 is merely exemplary. For example, the voltage selector circuit might alternatively be realized with bipolar transistors; those skilled in the art could readily see that opposite polarity configurations can also be realized.

The use of inverters 36, 38 and 40 is preferred as they serve to sharpen the comparator's output transitions as it changes state. The gain from the inputs at V1, V2 and V3 is finite; as such, the comparator outputs exhibit rounded corners as V1, V2 and V3 approach the switching point. The inverters ignore this rounding, and only switch after the outputs have begun to regenerate and cross through the mid-signal range, making the drive to the switching FETs change abruptly. The inverters' power supply nodes are preferably connected to the voltage selector circuit output terminal, such that they are powered by the highest available input voltage as selected by the circuit.

Figure 3:
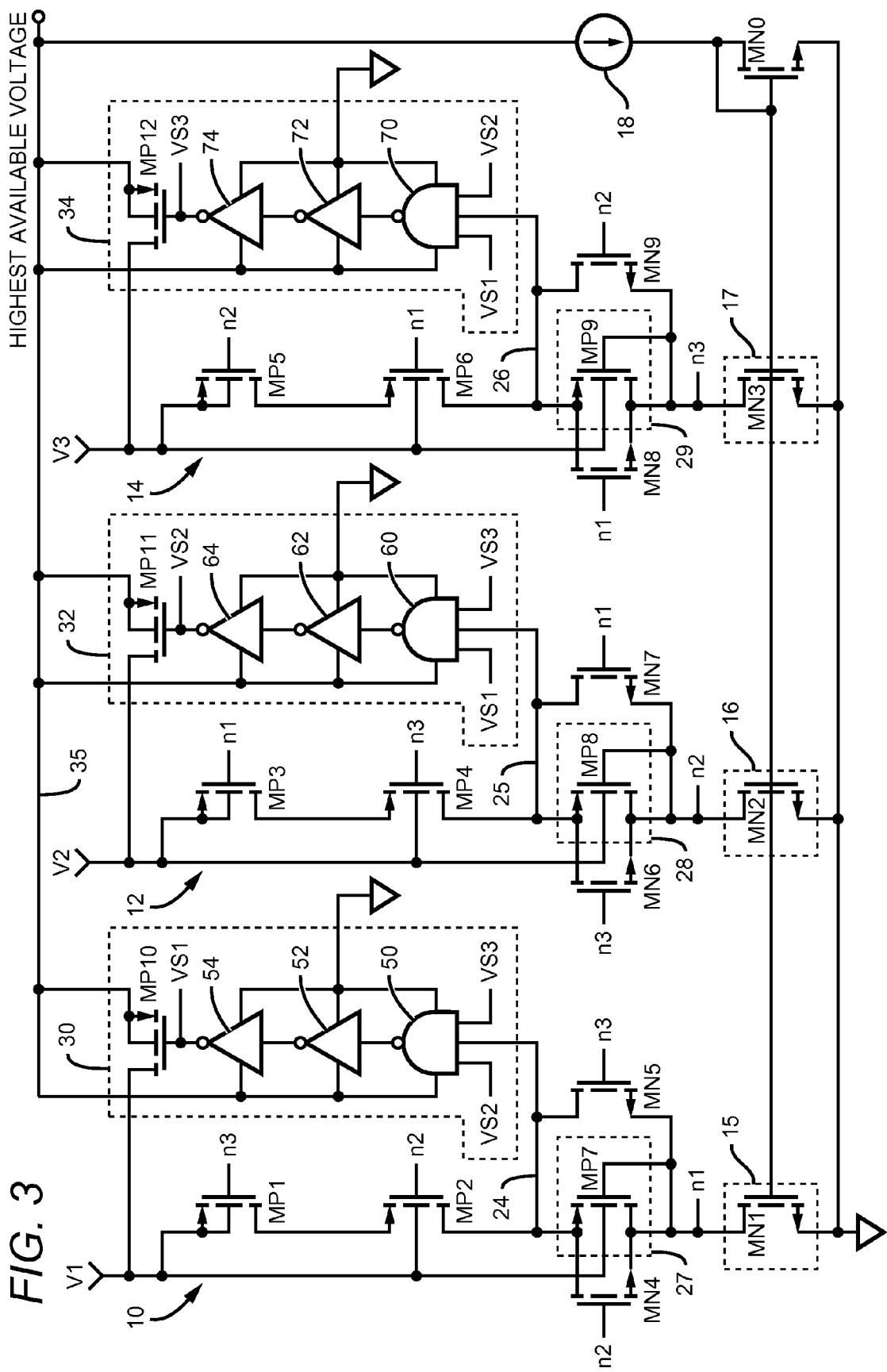
FIG. 3 is a schematic diagram of another possible embodiment of a voltage selector circuit per the present invention.

A preferred embodiment is shown in FIG. 3. Here, a logic gate is added to each circuit branch to provide full-digital lock-out, so as to prevent oscillations and to ensure that the circuit switches between one input voltage and another within a few nanoseconds. Here, each branch's switching circuit includes a logic gate—here, a NAND gate—having at least n inputs, and an output which is coupled to a switching circuit drive terminal; the signal at the drive terminal is used to operate a switch which connects the branch's input voltage to the voltage selector circuit's output terminal 35.

In the exemplary embodiment shown, circuit branch 10 has a switching circuit drive terminal VS1, and a 3-input NAND gate 50. One of the gate's inputs is connected to output node 24, and its other inputs are connected to the switching circuit drive terminals of branches 12 and 14 (VS2, VS3). The output of NAND gate 50 is coupled to switching circuit drive terminal VS1, here via two drive inverters 52 and 54, which in turn operates switching FET MP10.

Similarly, circuit branch 12 has a NAND gate 60, with one of its inputs connected to output node 25 and its other inputs connected to VS1 and VS3, and its output connected to switching circuit drive terminal VS2 and switching FET MP11 via drive inverters 62 and 64. Circuit branch 14 has a NAND gate 70, with one of its inputs connected to output node 26 and its other inputs connected to VS1 and VS2, and its output connected to switching circuit drive terminal VS3 and switching FET MP12 via drive inverters 72 and 74.

When so arranged, the output of NAND gate 50 can only go low such that MP10 is switched on when both VS2 and VS3 are high, indicating that V1 is the highest of the n input voltages. Similar, the output of NAND gate 60 can only go low and turn on MP11 when both VS1 and VS3 are high, indicating that V2 is the highest of the n input voltages, and the output of NAND gate 70 can only go low and turn on MP12 when both VS1 and VS2 are high, indicating that V3 is the highest of the n input voltages.

It is not essential that drive inverters be imposed between the logic gate outputs and the switches. However, they may be needed to increase the maximum output current available at the branch's switching circuit drive terminal, particularly when the switch is a large MOSFET. For example, each inverter might be arranged to up-scale the available output current by 10×. The drive inverters have associated power supply nodes which are preferably connected to voltage selector circuit output terminal 35, such that they are powered by the highest of the n input voltages.

Figure 4:
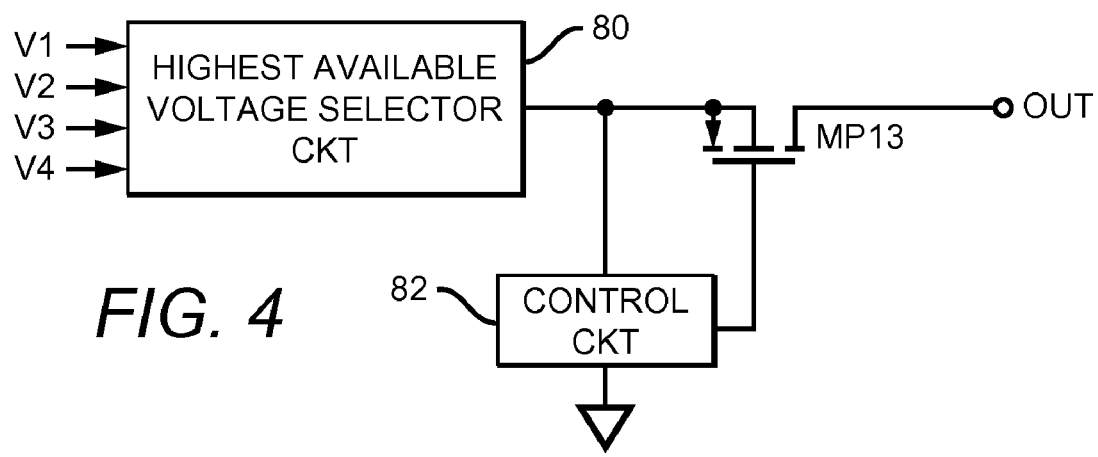
FIG. 4 is a block/schematic diagram of linear voltage regulator which employs a voltage selector circuit per the present invention.

The present voltage selector circuit is suitably used with a linear voltage regulator such as a low dropout (LDO) regulator. In this application, the circuit serves to address a situation in which the LDO's input voltage suddenly goes toward zero, and the regulator's output capacitor discharges through the body-diode of the regulator's PMOS output FET. A simplified schematic of an exemplary embodiment is shown in FIG. 4. Here, four input voltages V1-V4 are available. Each is provided to the inputs of a voltage selector circuit 80 as described herein, the output of which—i.e., the highest of V1-V4—is provided to the source terminal of the regulator's PMOS output FET MP13. The drain of MP13 provides the regulator's output voltage OUT. A control circuit 82 is arranged to drive MP13 as needed to regulate OUT, and is preferably powered by the output of voltage selector circuit 80.

While particular embodiments of the invention have been shown and described, numerous variations and alternate embodiments will occur to those skilled in the art. Accordingly, it is intended that the invention be limited only in terms of the appended claims.

I claim:

1. A scalable highest available voltage selector circuit, comprising:
   n input voltages;
   at least n current sources which output respective bias currents;
   at least n circuit branches, each of which comprises:

a logic gate circuit having first and second supply terminals, n−1 input terminals and an output node, said first supply terminal connected to a respective one of said input voltages and said second supply terminal connected to a respective one of said current sources; and a diode circuit connected between said output node and said second supply terminal, the voltage at the junction of said diode circuit and said current source being a control signal;

each of said logic gate circuit's input terminals connected to a respective one of said other branches' control signals, said logic gate circuit arranged such that its output node is toggled from a first state to a second state regeneratively and the logic gate circuit output nodes of said other branches are in said first state when the input voltage connected to said circuit branch is the highest of said n input voltages; and n switching circuits, each of which is coupled to the output node of a respective one of said logic gate circuits, said voltage selector circuit arranged such that each of said switching circuits connects the input voltage applied to said branch to a voltage selector circuit output terminal only when the logic gate circuit output node of said branch is in said second state, such that the voltage at said voltage selector circuit output terminal is the highest of said n input voltages.

2. The voltage selector circuit of claim 1, wherein each of said logic gate circuits is arranged to perform an NOR function on the control signals applied to its input terminals, such that said 'first' state is 'low' and said 'second' state is 'high'.

3. The voltage selector circuit of claim 2, wherein each of said n switching circuits comprise:
an inverter connected at its input to the output node of the logic gate circuit in the circuit branch to which said switching circuit is coupled; and
a PMOS FET having its source-drain circuit connected between the input voltage applied to said branch and said voltage selector circuit output terminal and its gate connected to the output of said inverter.

4. The voltage selector circuit of claim 1, wherein each of said n switching circuits comprise a MOSFET, the well of which is connected to said voltage selector circuit output terminal such that said wells are biased with the highest of said n input voltages.

5. The voltage selector circuit of claim 1, wherein each of said n switching circuits comprise:
an inverter connected at its input to the output node of the circuit branch to which said switching circuit is coupled; and
a FET having its source-drain circuit connected between the input voltage applied to said branch and said voltage selector circuit output terminal and its gate connected to the output of said inverter.

6. The voltage selector circuit of claim 5, wherein each of said inverters has an associated power supply node and is powered by a voltage applied to said power supply node, said power supply nodes connected to said voltage selector circuit output terminal such that said inverters are powered by the highest of said n input voltages.

7. The voltage selector circuit of claim 1, wherein n=3.

8. The voltage selector circuit of claim 1, wherein said current sources are provided by a current mirror powered by the highest of said n input voltages.

9. The voltage selector circuit of claim 1, wherein said bias currents are substantially equal.

10. The voltage selector circuit of claim 1, wherein each of said n switching circuits comprise:

a switching circuit drive terminal;

a logic gate having at least n inputs, one of which is connected to the output node of the circuit branch to which said switching circuit is coupled, said logic gate's other inputs connected to the drive terminals of the switching circuits of each of the other circuit branches, said logic gate's output coupled to said switching circuit drive terminal;

said voltage selector circuit arranged such that the output of a given switching circuit's logic gate toggles only when the input voltage connected to said branch is the highest of said n input voltages.

11. The voltage selector circuit of claim 10, further comprising one or more drive inverters connected in series between the output of said logic gate and said switching circuit drive terminal, said drive inverters arranged to increase the maximum output current available at said switching circuit drive output terminal.

12. The voltage selector circuit of claim 11, wherein each of said drive inverters has an associated power supply node and is powered by a voltage applied to said power supply node, said power supply nodes connected to said voltage selector circuit output terminal such that said drive inverters are powered by the highest of said n input voltages.

13. The voltage selector circuit of claim 10, wherein each of said n switching circuits comprise a MOSFET having its source-drain circuit connected between the input voltage connected to said branch and said voltage selector circuit output terminal and its gate connected to said switching circuit's drive terminal.

14. A scalable highest available voltage selector circuit, comprising:
n input voltages;
at least n current sources which output respective bias currents;
at least n circuit branches, each of which comprises:
n−1 "comparator" transistors having their current circuits connected between a respective one of said input voltages and an output node;
a diode-connected transistor connected between said output node and a respective one of said current sources such that said diode-connected transistor conducts said current source's bias current to said comparator transistors, the voltage at the junction of said diode-connected transistor and said current source being a control signal;
n−1 "shorting" transistors having their current circuits connected across said diode-connected transistor;
each of said circuit branch's comparator transistors having their control inputs connected to a respective one of said other branches' control signals such that said circuit branch's comparator transistors are driven on regeneratively and the comparator transistors of said other branches are driven off when the input voltage connected to said circuit branch is the highest of said n input voltages;
each of said circuit branch's shorting transistors having their control inputs connected to a respective one of said other branches' control signals such that said circuit branch's shorting transistors are driven off when the input voltage connected to said branch is the highest of said n input voltages and are otherwise driven on by said other branches' control signals; and
n switching circuits, each of which is coupled to the output node of a respective one of said branches, said voltage selector circuit arranged such that each of said switching circuits connects the input voltage applied to said branch to a voltage selector circuit output terminal only when the input voltage connected to said branch is the highest of said n input voltages, such that the voltage at said voltage selector circuit output terminal is the highest of said n input voltages.

15. The voltage selector circuit of claim 14, wherein said comparator and shorting transistors are FETs.

16. A highest available voltage selector circuit, comprising:
n input voltages;
at least n current sources which output respective bias currents;
at least n circuit branches, each of which comprises:
n−1 "comparator" field-effect transistors (FETs) having their source-drain circuits connected between a respective one of said input voltages and an output node;
a diode-connected FET connected between said output node and a respective one of said current sources such that said diode-connected FET conducts said current source's bias current to said comparator FETs, the voltage at the junction of said diode-connected FET and said current source being a control signal;
n−1 "shorting" FETs having their source-drain circuits connected across said diode-connected FET;
each of said circuit branch's comparator FETs having their gates connected to a respective one of said other branches' control signals such that said circuit branch's comparator FETs are driven on regeneratively and the comparator FETs of said other branches are driven off when the input voltage connected to said circuit branch is the highest of said n input voltages;
each of said circuit branch's shorting FETs having their gates connected to a respective one of said other branches' control signals such that said circuit branch's shorting FETs are driven off when the input voltage connected to said branch is the highest of said n input voltages and are otherwise driven on by said other branches' control signals; and
a switching circuit coupled to the output node of said circuit branch, said voltage selector circuit arranged such that said switching circuit connects the input voltage applied to said branch to a voltage selector circuit output terminal only when the input voltage connected to said branch is the highest of said n input voltages, said switching circuit comprising:
a switching circuit drive terminal;
a logic gate having at least n inputs, one of which is connected to the output node of the circuit branch to which said switching circuit is coupled, said logic gate's other inputs connected to the drive terminals of the switching circuits of each of the other circuit branches, said logic gate's output coupled to said switching circuit drive terminal;
said voltage selector circuit arranged such that the output of a given switching circuit's logic gate toggles only when the input voltage connected to said branch is the highest of said n input voltages.

17. A linear voltage regulator, comprising:
at least three available input voltages;
a highest available voltage selector circuit, comprising:
at least three current sources which output respective bias currents;
at least three circuit branches, each of which comprises:
at least two "comparator" transistors having their current circuits connected between a respective one of said input voltages and an output node;
a diode-connected transistor connected between said output node and a respective one of said current sources such that said diode-connected transistor conducts said current source's bias current to said comparator transistors, the voltage at the junction of said diode-connected transistor and said current source being a control signal;
at least two "shorting" transistors having their current circuits connected across said diode-connected transistor;
each of said circuit branch's comparator transistors having their control inputs connected to a respective one of said other branches' control signals such that said circuit branch's comparator transistors are driven on regeneratively and the comparator transistors of said other branches are driven off when the input voltage connected to said circuit branch is the highest of said at least three input voltages;
each of said circuit branch's shorting transistors having their control inputs connected to a respective one of said other branches' control signals such that said circuit branch's shorting transistors are driven off when the input voltage connected to said branch is the highest of said at least three input voltages and are otherwise driven on by said other branches' control signals; and
at least three switching circuits, each of which is coupled to the output node of a respective one of said branches, said voltage selector circuit arranged such that each of said switching circuits connects the input voltage applied to said branch to a voltage selector circuit output terminal only when the input voltage connected to said branch is the highest of said n input voltages, such that the voltage at said voltage selector circuit output terminal is the highest of said n input voltages;
a pass transistor connected in series between said voltage selector circuit output terminal and said regulator's output terminal; and
a control circuit arranged to control said pass transistors to provide a desired output voltage at said regulator's output terminal;
said control circuit connected to said voltage selector circuit output terminal such that it is powered by the highest of said at least three input voltages.

18. The voltage regulator of claim 17, wherein said pass transistor is a MOSFET, the well of which is connected to said voltage selector circuit output terminal such that said well is biased with the highest of said at least three input voltages.

* * * * *